United States Patent [19]

Sakaguchi et al.

[11] 4,054,713
[45] Oct. 18, 1977

[54] PROCESS FOR PREPARING GLASS FIBER MATS

[75] Inventors: Kahei Sakaguchi; Massaaki Minakata, both of Wakayama; Shigeru Takamori, Osaka; Jun-ichi Furukawa; Yoshinao Kono, both of Wakayama, all of Japan

[73] Assignee: Kao Soap Co., Ltd., Tokyo, Japan

[21] Appl. No.: 691,016

[22] Filed: May 28, 1976

Related U.S. Application Data

[63] Continuation of Ser. No. 536,902, Dec. 27, 1974, abandoned.

[30] Foreign Application Priority Data

Dec. 28, 1973 Japan .................................. 49-7474

[51] Int. Cl.$^2$ .......................... B05D 5/00; B32B 17/04
[52] U.S. Cl. .................................... 428/285; 156/236; 156/283; 260/40 R; 260/75 UA; 264/136; 264/137; 427/195; 427/390 A; 428/286; 428/287; 428/296; 428/436; 428/482; 428/522
[58] Field of Search .............. 428/436, 482, 285, 290, 428/287, 286, 522; 260/75 UA, 861, 40 R; 264/131, 134, 136, 137; 427/195, 390 A; 156/236, 283

[56] References Cited

U.S. PATENT DOCUMENTS

| | | | |
|---|---|---|---|
| 3,252,941 | 5/1966 | Mayer | 260/75 UA |
| 3,340,136 | 9/1967 | Burns | 260/75 UA |
| 3,345,339 | 10/1967 | Parker | 260/75 UA |
| 3,427,267 | 2/1969 | Stieger | 260/22 |
| 3,598,693 | 8/1971 | Anderson | 260/40 R |
| 3,649,338 | 3/1972 | Ishida | 260/40 R |
| 3,736,278 | 5/1973 | Wada et al. | 260/75 UA |

*Primary Examiner*—George F. Lesmes
*Assistant Examiner*—Stanley S. Silverman
*Attorney, Agent, or Firm*—Blanchard, Flynn, Thiel, Boutell & Tanis

[57] ABSTRACT

Glass fiber mats are prepared by binding glass fibers with a resinous component, wherein the resinous component is an unsaturated polyester resin powder having a melting point of 80° to 130° C and a molecular weight of 2,500 to 7,000 obtained by reacting (A) one mole of a dicarboxylic acid component comprising an α,β-unsaturated dicarboxylic acid or anhydride thereof, alone or in admixture thereof with a saturated dicarboxylic acid, with (B) 0.9 to 1.1 moles of a polyol component containing at least 50 molar percent of bis(β-hydroxy-ethyl) terephthalate of the formula:

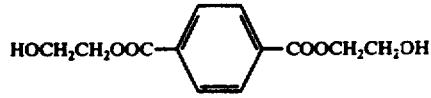

8 Claims, No Drawings

PROCESS FOR PREPARING GLASS FIBER MATS

This is a continuation of application Ser. No. 536,902, filed Dec. 27, 1974, now abandoned.

BACKGROUND OF THE INVENTION

1. Field of the Invention

This invention relates to a process for preparing glass fiber mats.

More particularly, this invention relates to a process for preparing glass fiber mats having a low solution velocity in a vinyl monomer.

2. Description of the Prior Art

It is common to use glass fiber mats as reinforcing agents for fiber reinforced plastics (FRP). Unsaturated polyester resin powders have been used as binders for the glass fiber mats. The glass fiber mats are prepared on an industrial basis by sprinkling the unsaturated polyester resin powder onto the glass fibers and placing the assemblage in a furnace to melt the resin, whereby the molten resin is bonded firmly to the glass fibers. Depending on the method of forming the FRP products, glass fiber mats having various solution velocities in vinyl monomers are demanded.

For obtaining a glass fiber mat having a low solution velocity in vinyl monomers, an unsaturated polyester resin having a low solution velocity in vinyl monomers should be used. However, many of the known unsaturated polyester resins have relatively high solution velocities in vinyl monomers and, accordingly, they do not exhibit a satisfactory property in this regard. A conventional method of obtaining a glass fiber mat having a low solution velocity in vinyl monomers comprises adding 1 to 3 weight percent of a catalyst such as benzoyl peroxide to the resin and heating the same in a furnace to cause a cross linking reaction of the resin. However, this method has a disadvantage that a satisfactorily uniform cross linking reaction does not always take place, because the cross linking reaction of the unsaturated polyester resin is caused by fumarate double bonds of the molecules and the benzoyl peroxide added as catalyst is in the form of a powder. Another disadvantage owing to the use of benzoyl peroxide is that the use of benzoyl peroxide is attended with a danger of explosion. Particularly, when benzoyl peroxide in the form of a powder is mixed with the resin powder, the operation is quite dangerous.

Another method of decreasing the rate of dissolution of a glass fiber met in vinyl monomers comprises controlling the chemical composition of the unsaturated polyester resin used as the binder. By this method, however, the decrease in the rate of dissolution is still insufficient. Generally, a glass fiber mat having a high rate of dissolution in a vinyl monomer is used in a low pressure molding process such as the hand lay-up process. In a low pressure operation, it is permissible that the resin binder is such as to dissolve rapidly in the vinyl monomer contained in the matrix resin to be molded, because the glass fiber mat does not move during the bubble removing operation wherein there is employed a roller under a low pressure. Rapid solution of the resin binder is rather preferred in this instance, because owing to its rapid solution in the vinyl monomer, the glass fiber mat becomes capable of conforming to the shape of the mold more rapidly and easily.

Recently, compression molding methods such as the matched die molding method have been developed and, in such methods, glass fibers mats having a quite low solution velocity in vinyl monomers are needed. In the compression molding operation, glass fiber mats should not dissolve rapidly in the vinyl monomer. Thus, it is preferred to use binders having low solution velocities in the vinly monomer.

SUMMARY OF THE INVENTION

An object of this invention is to provide a process for preparing glass fiber mats having essentially a low solution velocity in vinyl monomers. More particularly, the object of this invention is to provide a process for preparing glass fiber mats by using fibers as a base or substrate, and a resinous component as binder, characterized in that an unsaturated polyester resin having a low solution velocity in vinyl monomers is used as the resinous binder.

Another object of this invention is to provide glass fiber mats which essentially possess inproved tensile strength.

Still another object of this invention is to provide FRP laminates which have an excellent transparency, even though they contain glass fiber mats having a low solution velocity in vinyl monomers.

The objects of this invention are attained by a process for preparing glass fiber mats comprising mixing glass fibers as a base or substrate and a resinous component as a binder, wherein the binder is an unsaturated polyester powder having a melting point of 80° to 130° C and a molecular weight of 2,500 to 7,000 obtained by reacting (A) one mole of a dicarboxylic acid component comprising an α,β-unsaturated dicarboxylic acid, or anhyride thereof, alone or in admixture with a saturated dicarboxylic acid, with (B) 0.9 to 1.1 moles of a polyol component containing at least 50 molar percent of bis(β-hydroxyethyl) terephthalate of the formula:

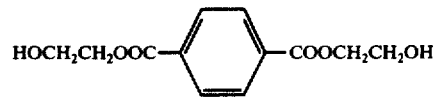

We have discovered that the preparation of glass fiber mats having a low solution velocity in vinyl monomers can be attained by using as the binder a resinous component which comprises an unsaturated polyester resin powder having a melting point (determined by the ring and ball test according to ASTM E-28-58 T; the same shall apply hereinafter) of 80° to 130° C and a molecular weight (number average molecular weight; the same shall apply hereinafter) of 2,500 to 7,000, obtained by reacting (A) a special dicarboxylic acid component and (B) a special polyol component. The resin powder has essentially a low solution velocity in vinyl monomers.

The objects of this invention can be attained by using an unsaturated polyester resin possessing, essentially, a low solution velocity in vinyl monomers. Conventional unsaturated polyester resins have a high solution velocity in vinyl monomers and, therefore, they cannot exhibit a satisfactory effect for the purposes of this invention. According to the present invention, it is possible to reduce the solution velocity of the unsaturated polyester resin by replacing a part or the entirety of the polyol component to be reacted with the unsaturated dicarboxylic acid component with a special diol. Thus, glass fiber mats suitable for the compression molding can be obtained.

The unsaturated polyester resins used in this invention are obtained by a polycondensation reaction of a polyol component containing at least 50 molar percent of a diol of formula (1):

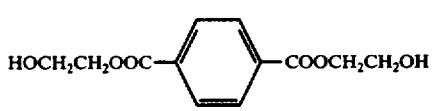

(1)

i.e. bis(β-hydroxyethyl) terephthalate, with a polycarboxylic acid component comprising an α,β-unsaturated dicarboxylic acid, or anhydride thereof, alone or in admixture thereof with a saturated dicarboxylic acid.

As the polyol components of the unsaturated polyester resins of this invention, which can be used together with the critical bis(β-hydroxyethyl) terephthalate, there can be mentioned, for example, aliphatic diols having up to 8 carbon atoms, such as ethylene glycol, diethylene glycol, propylene glycol, neopentyl glycol, butanediol, trimethylpentanediol, hydrogenated bisphenol A and diols of the formula (2):

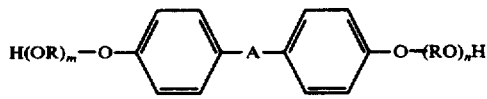

wherein R is an alkylene group of 2 or 3 carbon atoms, A is a 2-alkylidene group of 3 or 4 carbon atoms and $m$ and $n$ each represent a number of at least 1, the average of the sum of $m$ and $n$ not exceeding 3.

As the α,β-ethylenically unsaturated dicarboxylic acids, or anhydrides thereof, used in this invention, there can be mentioned, for example, maleic acid, maleic anhydride, fumaric acid and itaconic acid. Inter alia, fumaric acid and maleic anhydride are advantageous from the industrial viewpoint. As the saturated dicarboxylic acids, there can be mentioned, for example, aromatic dicarboxylic acids of the formula HOOC-$R_1$-COOH wherein $R_1$ is a bivalent unsaturated monocyclic hydrocarbon radical having six carbon atoms in the ring and ring substituted with up to 3 alkyls having 1 to 4 carbon atoms such as phthalic acid, phthalic anhydride, tetrahydrophthalic acid, tetrahydrophthalic anhydride, isophthalic acid, terephthalic acid, methylisophthalic acid and methylterephthalic acid; and aliphatic dicarboxylic acids of the formula HOOC-$R_2$-COOH wherein $R_2$ is alkylene having one to 8 carbon atoms such as succinic acid, adipic acid, azelaic acid and sebacic acid. The amount of the saturated dicarboxylic acid can be up to 90 mole percent, based on the sum of the weights of α,β-unsaturated dicarboxylic acids and saturated dicarboxylic acid, and the balance of said dicarboxylic acid component is said 60 ,β-unsaturated dicarboxylic acid.

In the polycondensation reaction, from 0.9 to 1.1 moles of the polyol component are used, per mole of the dicarboxylic acid component. The reaction is carried out in an inert gas at a temperature in the range of 180° to 240° C.

In the manner as described above, unsaturated polyester resins having melting points of 80° to 130° C can be prepared easily.

The unsaturated polyester resin of this invention prepared as described above has essentially a low solution velocity in vinyl monomers. According to the process of this invention, therefore, it is unnecessary to reduce the solution velocity of the resin in the vinyl monomer by heating the resin together with benzoyl peroxide to effect cross linking, as in conventional processes.

The glass fiber mats obtained by the process of this invention are useful for FRP molding methods, particularly matched die compression molding methods. More concretely, the glass fiber mats are suitable for preparing insulating laminated sheets and SMC (sheet molding compound).

An advantage of the use of the glass fiber mat having a low solution velocity in vinyl monomers obtained by the process of this invention is that the resin used as the binder does not dissolve rapidly in the vinyl monomer contained in the liquid resin used as matrix resin in the compression molding operation. Therefore, the glass fiber mat is not damaged during the compression operation and there is obtained an FRP product having excellent dimensional stability and surface smoothness.

Generally, in the molding of a transparent resin containing neither pigment nor filler, the transparency of the resulting product is damaged if the resin used has a high solution velocity in the vinyl monomer. The unsaturated polyester resins according to the present invention are free from this disadvantage. By the process of this invention, transparent laminates can be obtained.

The unsaturated polyester resins employed in this invention are pulverized with any suitable pulverizing apparatus into powders of a particle size of less than 40 mesh (Japanese Industrial Standard). The resin used as the binder in the preparation of the glass fiber mats according to the present invention suitably has a particle size of 40 to 200 mesh (Japanese Industrial Standard).

In the preparation of the glass fiber mats, the resin used as the binder is substantially uniformly applied on the glass fiber mat in the form of a powder. Alternatively, a dispersion of the powder in water may be sprayed onto the mat. In this latter case, the particle size of the binder resin is preferably less than 200 mesh. In case the resin used as the binder is applied in the form of a powder, less than 2 weight percent of a metal salt of a higher fatty acid or a fine powder of silica can be added thereto as a lubricant for improving the fluidity of the powder and for preventing aggregation of the powder into lumps.

The glass fiber mats of this invention can be prepared in a customary manner. A molten glass material is spun from the bottom of a crucible into fibers having a diameter of 9 to 13 μ through platinum bushings. From 200 to 400 filaments are bundled into a strand by a treatment with a bundling agent. The strand is wound up into a skein and is dried. Each strand is used directly, or after combining from 40 to 60 strands into a roving, for the preparation of glass fiber mats.

Glass fiber mats can be divided into two general groups, depending on the method of the preparation thereof. One group comprises glass fiber mats prepared from chopped strands obtained by cutting the strands or the roving into staples of 25 to 50 mm in length. The products thus obtained are called chopped strand mats. Another group comprises glass fiber mats prepared from uncut strands and these products are called continuous strand mats.

The glass fiber mats of the present invention are prepared by using a continuous mat producing machine. The chopped strands or continuous strands are placed on a running belt and, in the next step, the unsaturated polyester resin binder of the present invention is applied thereon. The amount of the binder resin applied to the strands is from 2.5 to 10 weight percent, preferably 3 to 6 weight percent, based on the weight of the glass fibers. If the amount of the binder resin applied is less than 2.5 weight percent, the shape of the mat cannot be maintained. On the other hand, if the amount of the binder resin applied is more than 10 weight percent, the resulting mat is too hard and, consequently, the workability thereof is reduced remarkably, while the tensile strength of the mat is sufficient. After applying the binder resin, water is sprinkled on the mat for improving the retention of the resin on the mat. Then the resin is melted to adhere same to the glass fibers. For example, the belt moves into a furnace having a temperature of about 180° to 240° C. After a residence time of about 2 to 3 minutes, the belt leaves the furnace and directly thereafter, the mat is compressed with cooling rolls and is wound up to yield the desired product. For estimating the quality of the product, important criteria are uniformity of weight and uniformity of the distribution of the binder resin powder.

In the present invention, products which satisfy commercial requirements for uniformity of weight and uniformity of distribution of the binder resin powder were tested to determine the solubility in styrene and the tensile strength of each mat.

The solubilities of the glass fiber mats in styrene in the Examples and Comparative Examples below, where determined in the following manner: A glass fiber mat was cut into pieces having a length of 12.5 cm and a width of 10 cm. The upper and the lower ends of the mat were fixed with clips of substantially the same width. A weight was hung from the lower clip so as to adjust the sum of the weights of the clip and the weight to 100 ± 1 g. The mat was suspended in a tank filled with styrene at 25° C by affixing the upper clip to a supporting rod disposed above the styrene bath. The time required until the glass fiber mat broke, due to dissolving of the binder resin in styrene, was determined. The solubility of the binder resin in styrene is shown by that measured time.

The tensile strength of the glass fiber mat was determined by cutting the mat into pieces having a width of 10 cm and a length of 25 cm and stretching the pieces in their longitudinal direction. The tensile strength of the mat was measured by the load applied at the time of breaking of the mat. The measurement device was Autograph of Shimazu Seisakusho KK. The cross head speed was 20 cm/min.

In the solubility test in styrene and the tensile strength test, 10 samples of each glass fiber mat were tested and the mean value of these measured values is reported in the Examples. It is considered that glass fiber mats which exhibit a value of 10 minutes or more in solubility test in styrene are satisfactorily insoluble in vinyl monomers for the purposes of this invention. The glass fiber mats prepared by using the unsaturated polyester resin of the present invention exhibited a value of 10 minutes or longer in this test.

Glass fiber mats having a tensile strength of 10 Kg or more are satisfactory for the purposes of this invention. The respective glass fiber mats prepared by the process of the present invention exhibited a tensile strength of more than 15 Kg.

It is possible to use the unsaturated polyester resin powder, according to the invention, in admixture with other polyester resins, provided that the amount of the unsaturated polyester resin is present in the glass fiber mat in an amount of at least 2.5 weight percent, based on the glass fibers.

The characteristic features of the present invention will be further described in reference to the following illustrative Examples.

EXAMPLE 1

In a reaction vessel provided with a stirrer, a thermometer, a nitrogen-introducing pipe and a dehydrating pipe, there were charged 508 g (2.0 moles) of bis($\beta$-hydroxyethyl) terephthalate, 196 g (2.0 moles) of maleic anhydride and 0.28 g of hydroquinone. The reaction was carried out in a nitrogen gas stream at a temperature of 180° to 230° C while the water formed by the reaction was distilled off, to obtain an unsaturated polyester having an acid value of 22 and a melting point of 110° C.

The resin thus obtained was pulverized. Chopped strand mats (weight: 450 g/m$^2$) of glass fibers were prepared according to the process as described above. The resulting chopped strand mats had the following properties:

Solubility in styrene: more than 10 mins.
Mat tensile strength: 30 Kg

EXAMPLE 2

Into the same reaction vessel as described in Example 1, there were charged 508 g (2.0 moles) of bis($\beta$-hydroxyethyl) terephthalate, 98 g (1.0 mole) of maleic anhydride, 166 g (1.0 mole) of isophthalic acid and 0.31 g of hydroquinone. The reaction was carried out in a nitrogen gas stream at a temperature of 180° to 230° C while the water formed by the reaction was distilled off to obtain an unsaturated polyester having an acid value of 22 and a melting point of 110° C.

The resin thus obtained was pulverized. Chopped strand mats (weight: 450 g/m$^2$) of glass fibers were prepared according to the process as described above. The resulting chopped strand mats had the following properties:

Solubility in styrene: more than 10 mins.
Mat tensile strength: 25 Kg

EXAMPLE 4

Into the same reaction vessel as described in Example 1, there were charged 381 g (1.5 moles) of bis($\beta$-hydroxyethyl) terephthalate, 130 g (0.4 mole) of 2,2-bis(4-hydroxyphenyl) propane, 9.2 g (0.1 mole) of glycerol, 232 g (2.0 moles) of fumaric acid and 0.30 g of hydroquinone. The reaction was carried out in a nitrogen gas stream at a temperature of 180° to 230° C while the water formed by the reaction was distilled off to obtain an unsaturated polyester resin having an acid value of 22 and a melting point of 115° C.

The resin thus obtained was pulverized. Chopped strand mats (weight: 450 g/m$^2$) of glass fibers were prepared according to the process as described above. The resulting chopped strand mats had the following properties:

Solubility in styrene: more than 10 mins.
Mat tensile strength: 27 Kg

EXAMPLE 4

Into the same reaction vessel as described in Example 1, there were charged 381 g (1.5 moles) of bis($\beta$-hydroxyethyl) terephthalate, 163 g (0.5 mole) of 2,2-bis($\beta$- hydroxyethoxyphenyl) propane, 98 g (1.0 mole) of maleic anhydride, 166 g (1.0 mole) of isophthalic acid and 0.34 g of hydroquinone. The reaction was carried out in a nitrogen gas stream at a temperature of 180° to 230° C while the water formed by the reaction was distilled off to obtain an unsaturated polyester resin having an acid value of 20 and a melting point of 113° C.

The resin thus obtained was pulverized. Chopped strand mats (weight: 450 g/m$^2$) of glass fibers were prepared according to the process as described above. The resulting chopped strand mats had the following properties:

Solubility in styrene: more than 10 mins.
Mat tensile strength: 23 Kg

EXAMPLE 5

Into the same reaction vessel as described in Example 1, there were charged 508 g (2.0 moles) of bis($\beta$-hydroxyethyl) terephthalate, 162 g (0.5 mole) of 2,2-bis($\beta$-hydroxyethoxyphenyl) propane, 177 g (0.5 mole) of 2,2-bis($\beta$-hydroxypropoxyphenyl) propane, 294 g (3.0 moles) of maleic anhydride and 0.32 of hydroquinone. The reaction was carried out in a nitrogen gas stream at a temperature of a 180° to 230° C while the water formed by the reaction was distilled off to obtain an unsaturated polyester resin having an acid value of 21 and a melting point of 115° C.

The resin thus obtained was pulverized. Chopped strand mats (weight: 450 g/m$^2$) of glass fibers were prepared according to the process as described above. The resulting chopped strand mats had the following properties:

Solubility in styrene: more than 10 mins.
Mat tensile strength: 25 Kg

EXAMPLES 6-10

Continuous strand mats of glass fibers (weight: 300 g/m$^2$) were prepared by using the resin powders of Examples 1-5 according to the process as described above. The solubility in styrene and mat tensile strength of each mat were as shown in Table 1.

Table 1

| Example | Solubility in styrene | Mat tensile strength (Kg) |
|---|---|---|
| 6 | More than 10 minutes | 18 |
| 7 | More than 10 minutes | 15 |
| 8 | More than 10 minutes | 16 |
| 9 | More than 10 minutes | 15 |
| 10 | More than 10 minutes | 16 |

COMPARATIVE EXAMPLE 1

Into the same reaction vessel as described in Example 1, there were charged 710 g (96 molar percent) of 2,2-bis($\beta$-hydroxyethoxyphenyl) propane, 267 g (100 molar percent) of fumaric acid, 8.47 g (4 molar percent) of glycerol and 0.18 g of hydroquinone. The reaction was carried out in nitrogen gas stream at a temperature of 180° to 210° C while the water formed by the reaction was distilled off to obtain an unsaturated polyester having an acid value of 16 and a melting point of 115° C.

The resin thus obtained was pulverized. Chopped strand mats (weight: 450 g/m$^2$) of glass fibers were prepared according to the process as described above. The resulting chopped strand mats had the following properties:

Solubility in styrene: 1 Min. Mat tensile strength: 25 Kg

COMPARATIVE EXAMPLE 2

Into the same reaction vessel as described in Example 1, there were charged 325 g (1.0 mole) of 2,2-bis($\beta$-hydroxyethoxyphenyl) propane, 116 g (1.0 mole) of fumaric acid and 0.22 g of hydroquinone. The reaction was carried out in a nitrogen gas stream at a temperature of 180° to 210° C to obtain an unsaturated polyester resin having an acid value of 15 and a melting point of 118° C.

The resin thus obtained was pulverized. Chopped strand mats (weight: 450 g/m$^2$) of glass fibers were prepared according to the process as described above. The resulting chopped strand mats had the following properties:

Solubility in styrene: 52 Seconds
Mat tensile strength: 24 Kg

COMPARATIVE EXAMPLE 3

Into the same reaction vessel as described in Example 1, there were charged 743 g (2.10 moles) of 2,2-bis($\beta$-hydroxypropoxyphenyl) propane, 232 g (2.0 moles) of fumaric acid and 0.39 g of hydroquinone. The reaction was carried out in a nitrogen gas stream at a temperature of 180° to 210° C to obtain an unsaturated polyester resin having an acid value of 15 and a melting point of 118° C.

The resin thus obtained was pulverized. Chopped strand mats (weight: 450 g/m$^2$) of glass fibers were prepared according to the process as described above. The resulting chopped strand mats had the following properties:

Solubility in styrene: 40 Seconds
Mat tensile strength: 15 Kg

COMPARATIVE EXAMPLE 4

Into the same reaction vessel as described in Example 1, there were charged 389 g (1.1 moles) of 2,2-bis($\beta$-hydroxypropoxyphenyl) propane, 62 g (1.0 mole) of ethylene glycol, 232 g (2.0 moles) of fumaric acid and 0.35 g of hydroquinone. The reaction was carried out at a temperature of 180° to 210° C to obtain an unsaturated polyester resin having an acid value of 12 and a melting point of 112° C.

The resin thus obtained was pulverized. Chopped strand mats (weight: 450 g/m$^2$) of glass fibers were prepared according to the process as described above. The resulting chopped strand mats had the following properties:

Solubility in styrene: 44 Seconds
Mat tensile strength: 20 Kg

COMPARATIVE EXAMPLE 5

Into the same reaction vessel as described in Example 1, there were charged 604 g (5.78 moles) of neopentyl glycol, 120 g (1.33 moles) of diethylene glycol, 222 g (2.18 moles) of maleic anhydride, 754 g (4.53 moles) of isophthalic acid and 0.51 g of hydroquinone. The reaction was carried out in a nitrogen gas stream at a temperature of 180° to 210° C to obtain an unsaturated polyester resin having an acid value of 13 and a melting point of 116° C.

The resin thus obtained was pulverized. Chopped strand mats (weight: 450 g/m$^2$) of glass fibers were prepared according to the process as described above. The resulting chopped strand mats had the following properties:

Solubility in styrene: 45 Seconds

Mat tensile strength: 18 Kg

COMPARATIVE EXAMPLE 6

Into the same reaction vessel as described in Example 1, there were charged 319 g (4.2 moles) of propylene glycol, 98 g (1.0 mole) of maleic anhydride, 498 g (3.0 moles) of isophthalic acid and 0.37 g of hydroquinone. The reaction was carried out in a nitrogen gas stream at a temperature of 180° to 210° C to obtain an unsaturated polyester resin having an acid value of 22 and a melting point of 106° C.

The resin thus obtained was pulverized. Chopped strand mats (weight: 450 g/m²) of glass fibers were prepared according to the process as described above. The resulting chopped strand mats had the following properties:

Solubility in styrene: 47 Seconds
Mat tensile strength: 10 Kg

EXAMPLES 11 and 12

The resin powder obtained in Example 1 and the resin powder obtained in Comparative Example 1 were mixed together. By using the mixture, glass fiber chopped strand mats (weight: 450 g/m²) were prepared according to the process as described above. The resulting chopped strand mats had the properties as shown in Table 2.

Table 2

| Example | Resin of Example 1 | Resin of Comparative Example 1 | Solubility in styrene | Mat tensile strength |
|---|---|---|---|---|
| 11 | 60 parts | 40 parts | More than 10 minutes | 26 Kg |
| 12 | 75 parts | 25 parts | More than 10 minutes | 28 Kg |

The embodiments of the invention in which an exclusive property or privilege is claimed are defined as follows:

1. A process for preparing resin-bonded glass fiber mats having a low solubility in vinyl monomers, which comprises:

incorporating in a glass fiber mat from 2.5 to 10 percent by weight, based on the weight of the glass fibers, of a powder of unsaturated polyester resin having a melting point of from 80° to 130° C and a molecular weight of from 2500 to 7000, obtained by reacting (A) a dicarboxylic acid component consisting essentially of from 10 to 100 molar percent of at least one α,β-ethylenically unsaturated dicarboxylic acid, or anhydride thereof, and the balance is at least one aliphatic or aromatic dicarboxylic acid, or anhydride thereof, and (B) a polyol component consisting of from 50 to 100 molar percent of bis(β-hydroxyethyl) terephthalate and the balance is one or more polyester-forming polyols, the molar ratio of A:B being 1:0.9 to 1.1.

2. A process in accordance with claim 1, in which said powder has a particle size of less than 40 mesh.

3. A process in accordance with claim 1, in which said glass fiber mat having said unsaturated polyester resin powder incorporated therein is heated to melt the resin and adhere it to the glass fibers.

4. A process in accordance with claim 3 in which said mat is heated at from about 180° to 240° C for from about 2 to 3 minutes to melt said resin.

5. A process in accordance with claim 1, in which said aliphatic or aromatic dicarboxylic acid has the formula HOOC-R-COOH, wherein R is alkylene having one to 8 carbon atoms or a bivalent unsaturated monocyclic hydrocarbon group having six carbon atoms in the ring and being ring substituted with up to 3 alkyls having 1 to 4 carbon atoms.

6. A process in accordance with claim 1 in which said α,β-unsaturated dicarboxylic acid is selected from the group consisting of maleic acid, maleic anhydride, fumaric acid and itaconic acid.

7. A resin-bonded glass fiber mat having a low solubility in vinyl monomers, which comprises:

a glass fiber mat having adhered thereto and substantially uniformly distributed thereon from 2.5 to 10 percent by weight, based on the weight of the glass fibers, of unsaturated polyester resin having a melting point of from 80° to 130° C and a molecular weight of from 2500 to 7000, obtained by reacting (A) a dicarboxylic acid component consisting essentially of from 10 to 100 molar percent of at least one α,β-ethylenically unsaturated dicarboxylic acid, or anhydride thereof, and the balance is at least one aliphatic or aromatic dicarboxylic acid, or anhydride thereof, and (B) a polyol component consisting of from 50 to 100 molar percent of bis(β-hydroxyethyl) terephthalate and the balance is one or more polyester-forming polyols, the molar ratio of A:B being 1:0.9 to 1.1.

8. A fiber reinforced plastic article comprising a vinyl resin reinforced with at least one glass fiber mat containing substantially uniformly distributed thereon from 2.25 to 10 percent by weight, based on the weight of the glass fibers, of unsaturated polyester resin having a melting point of from 80° to 130° C and a molecular weight of from 2500 to 7000, obtained by reacting (A) a dicarboxylic acid component consisting essentially of from 10 to 100 molar percent of at least one α,β-ethylenically unsaturated dicarboxylic acid, or anhydride thereof, and the balance is at least one aliphatic or aromatic dicarboxylic acid, or anhydride thereof, and (B) a polyol component consisting of from 50 to 100 molar percent of bis(β-hydroxyethyl) terephthalate and the balance is one or more polyester-forming polyols, the molar ratio of A:B being 1:0.9 to 1.1.

* * * * *